(12) United States Patent
Nguyen et al.

(10) Patent No.: US 12,192,034 B2
(45) Date of Patent: Jan. 7, 2025

(54) SYSTEM AND METHOD FOR DISTANCE MEASUREMENT USING UWB RADAR

(71) Applicant: Samsung Electronics Co., Ltd., Suwon-si (KR)

(72) Inventors: Hoang Viet Nguyen, Plano, TX (US); Yuming Zhu, Plano, TX (US); Jiho Shin, Suwon-si (KR); Qiang Xie, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 86 days.

(21) Appl. No.: 18/160,873

(22) Filed: Jan. 27, 2023

(65) Prior Publication Data

US 2023/0246882 A1    Aug. 3, 2023

Related U.S. Application Data

(60) Provisional application No. 63/305,030, filed on Jan. 31, 2022, provisional application No. 63/343,212, filed on May 18, 2022.

(51) Int. Cl.
*H04L 5/12*  (2006.01)
*H04L 25/02*  (2006.01)
*H04W 64/00*  (2009.01)

(52) U.S. Cl.
CPC ....... *H04L 25/0212* (2013.01); *H04W 64/003* (2013.01)

(58) Field of Classification Search
CPC .............. H04L 25/0212; H04W 64/003
USPC ............... 375/262, 260, 259, 219, 295, 316
See application file for complete search history.

(56) References Cited

U.S. PATENT DOCUMENTS

| | | |
|---|---|---|
| 11,137,491 B2 | 10/2021 | Kim et al. |
| 11,408,990 B2 | 8/2022 | Casamassima et al. |
| 11,445,468 B2 | 9/2022 | Yang et al. |
| 2018/0164874 A1* | 6/2018 | Qiu ................ G01S 15/66 |
| 2019/0271775 A1 | 9/2019 | Zhang et al. |
| 2021/0014541 A1* | 1/2021 | Park ............... H04N 21/2381 |

FOREIGN PATENT DOCUMENTS

KR    20220143352 A    10/2022

* cited by examiner

*Primary Examiner* — Zewdu A Kassa

(57) ABSTRACT

A method includes obtaining a channel impulse response (CIR) based on multiple ultrawide band (UWB) measurements between a mobile device and a target object. The method also includes estimating a first distance between the mobile device and the target object based on an energy of the CIR. The method also includes estimating a second distance between the mobile device and the target object based on a phase of the CIR. The method also includes obtaining an estimated distance between the mobile device and the target object based on at least one of the first distance and the second distance.

20 Claims, 11 Drawing Sheets

SYSTEM AND METHOD FOR DISTANCE MEASUREMENT USING UWB RADAR

CROSS-REFERENCE TO RELATED APPLICATIONS AND CLAIM OF PRIORITY

The present application claims priority to U.S. Provisional Patent Application Ser. No. 63/305,030 filed on Jan. 31, 2022, and to U.S. Provisional Patent Application Ser. No. 63/343,212 filed on May 18, 2022. The contents of the above-identified patent documents are incorporated herein by reference.

TECHNICAL FIELD

The present disclosure relates generally to wireless communication systems and, more specifically, the present disclosure relates to a system and method for distance measurement in close range using ultra-wideband (UWB) radar.

BACKGROUND

Ultra-Wideband (UWB) technology has been recently introduced into consumer electronic devices, including smart phones, to provide spatial awareness capability, with applications such as indoor localization and device-to-device localization. More use cases are being developed to take advantage of this capability. One such use case is using UWB radar to measure distance from the radar to an object of interest in close range, at centimeter-level accuracy. Such capability is highly applicable, for example, as an alternative technology to the light-based Time-of-Flight (TOF) sensor, which is typically available only in high-end electronic devices due to the sensor's high cost.

SUMMARY

The present disclosure relates to wireless communication systems and, more specifically, the present disclosure relates to a system and method for distance measurement in close range using UWB radar.

In one embodiment, a method includes obtaining a channel impulse response (CIR) based on multiple ultrawide band (UWB) measurements between a mobile device and a target object. The method also includes estimating a first distance between the mobile device and the target object based on an energy of the CIR. The method also includes estimating a second distance between the mobile device and the target object based on a phase of the CIR. The method also includes obtaining an estimated distance between the mobile device and the target object based on at least one of the first distance and the second distance.

In another embodiment, a device includes a transceiver and a processor operably connected to the transceiver. The processor is configured to: obtain a CIR based on multiple UWB measurements between a mobile device and a target object; estimate a first distance between the mobile device and the target object based on an energy of the CIR; estimate a second distance between the mobile device and the target object based on a phase of the CIR; and obtain an estimated distance between the mobile device and the target object based on at least one of the first distance and the second distance.

In yet another embodiment, a non-transitory computer readable medium includes program code that, when executed by a processor of a device, causes the device to: obtain a CIR based on multiple UWB measurements between a mobile device and a target object; estimate a first distance between the mobile device and the target object based on an energy of the CIR; estimate a second distance between the mobile device and the target object based on a phase of the CIR; and obtain an estimated distance between the mobile device and the target object based on at least one of the first distance and the second distance.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

The present disclosure covers several components which can be used in conjunction or in combination with one another or can operate as standalone schemes. Certain embodiments of the disclosure may be derived by utilizing a combination of several of the embodiments listed below. Also, it should be noted that further embodiments may be derived by utilizing a particular subset of operational steps as disclosed in each of these embodiments. This disclosure should be understood to cover all such embodiments.

Figure 1:
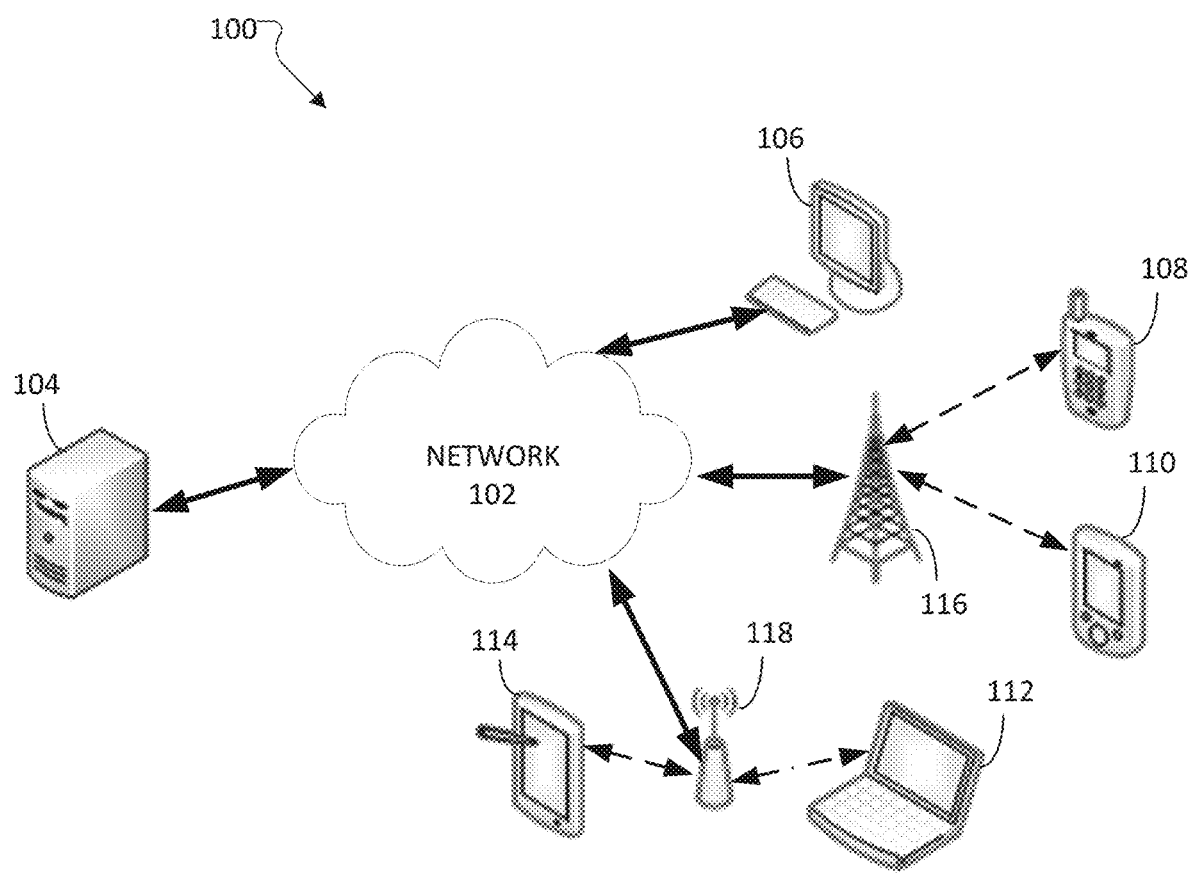
FIG. 1 illustrates an example communication system according to embodiments of this disclosure.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-114. The client devices 106-114 may be, for example, a smartphone (such as a UE), a tablet computer, a laptop, a personal computer, a wearable device, a head mounted display, or the like. The server 104 can represent one or more servers. Each server 104 includes any suitable computing or processing device that can provide computing services for one or more client devices, such as the client devices 106-114. Each server 104 could, for example, include one or more processing devices, one or more memories storing instructions and data, and one or more network interfaces facilitating communication over the network 102.

Each of the client devices 106-114 represent any suitable computing or processing device that interacts with at least one server (such as the server 104) or other computing device(s) over the network 102. The client devices 106-114 include a desktop computer 106, a mobile telephone or mobile device 108 (such as a smart phone), a PDA 110, a laptop computer 112, and a tablet computer 114. However, any other or additional client devices could be used in the communication system 100, such as wearable devices. Smartphones represent a class of mobile devices 108 that are handheld devices with mobile operating systems and integrated mobile broadband cellular network connections for voice, short message service (SMS), and Internet data communications. In certain embodiments, any of the client devices 106-114 can perform processes for distance measurement in close range using UWB radar.

In this example, some client devices 108-114 communicate indirectly with the network 102. For example, the mobile device 108 and PDA 110 communicate via one or more base stations 116, such as cellular base stations or eNodeBs (eNBs) or gNodeBs (gNBs). Also, the laptop computer 112 and the tablet computer 114 communicate via one or more wireless access points 118, such as IEEE 802.11 wireless access points. Note that these are for illustration only and that each of the client devices 106-114 could communicate directly with the network 102 or indirectly with the network 102 via any suitable intermediate device(s) or network(s). In certain embodiments, any of the client devices 106-114 transmit information securely and efficiently to another device, such as, for example, the server 104.

Although FIG. 1 illustrates one example of a communication system 100, various changes can be made to FIG. 1. For example, the communication system 100 could include any number of each component in any suitable arrangement.

In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
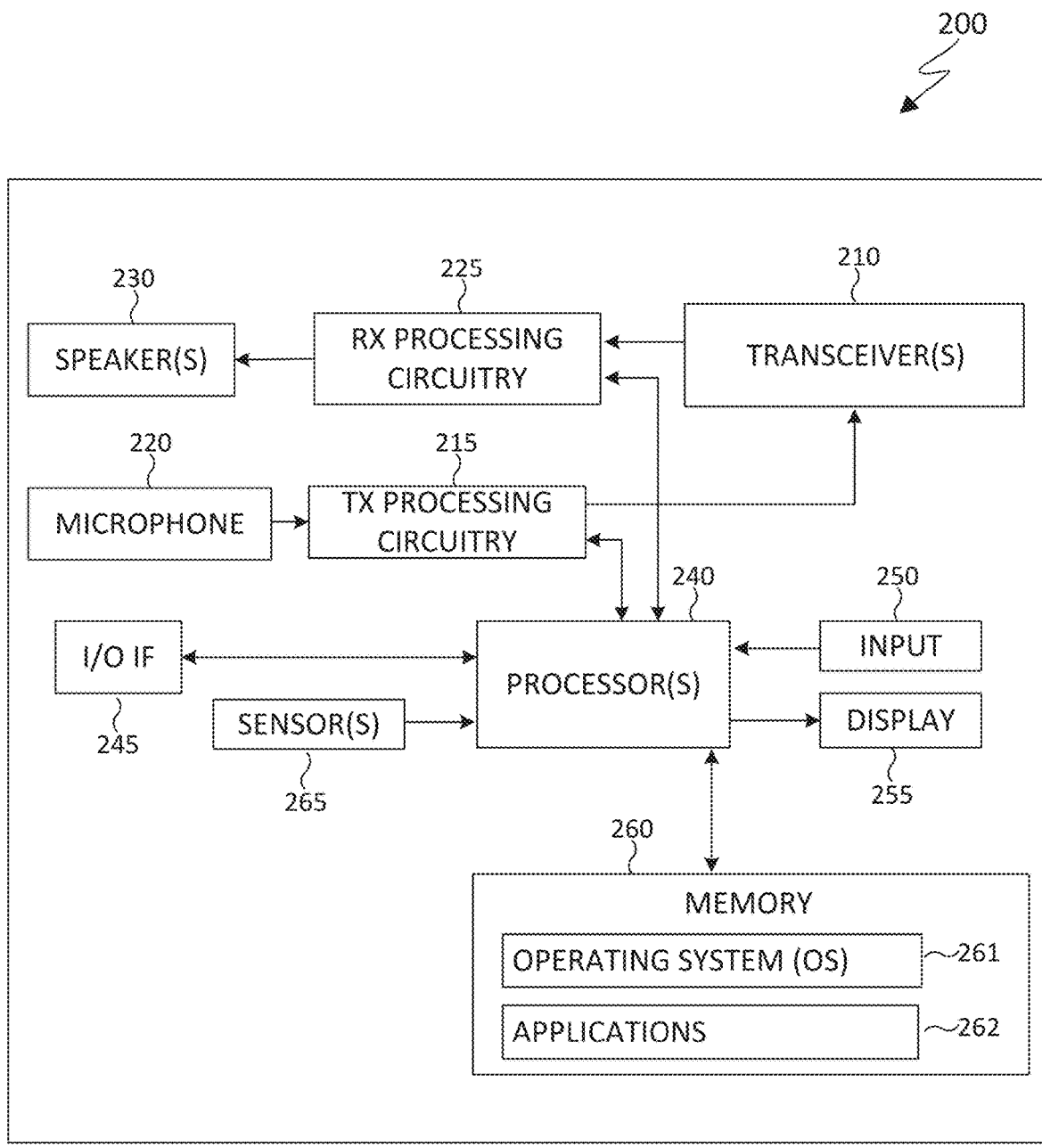
FIG. 2 illustrates an example electronic device according to embodiments of this disclosure.

FIG. 2 illustrates an example electronic device in accordance with an embodiment of this disclosure. In particular, FIG. 2 illustrates an example electronic device 200, and the electronic device 200 could represent the server 104 or one or more of the client devices 106-114 in FIG. 1. The electronic device 200 can be a mobile communication device, such as, for example, a UE, a mobile station, a subscriber station, a wireless terminal, a desktop computer (similar to the desktop computer 106 of FIG. 1), a portable electronic device (similar to the mobile device 108, the PDA 110, the laptop computer 112, or the tablet computer 114 of FIG. 1), a robot, and the like.

As shown in FIG. 2, the electronic device 200 includes transceiver(s) 210, transmit (TX) processing circuitry 215, a microphone 220, and receive (RX) processing circuitry 225. The transceiver(s) 210 can include, for example, a RF transceiver, a BLUETOOTH transceiver, a WiFi transceiver, a ZIGBEE transceiver, an infrared transceiver, and various other wireless communication signals. The electronic device 200 also includes a speaker 230, a processor 240, an input/output (I/O) interface (IF) 245, an input 250, a display 255, a memory 260, and a sensor 265. The memory 260 includes an operating system (OS) 261, and one or more applications 262.

The transceiver(s) 210 can include an antenna array including numerous antennas. For example, the transceiver(s) 210 can be equipped with multiple antenna elements. There can also be one or more antenna modules fitted on the terminal where each module can have one or more antenna elements. The antennas of the antenna array can include a radiating element composed of a conductive material or a conductive pattern formed in or on a substrate. The transceiver(s) 210 transmit and receive a signal or power to or from the electronic device 200. The transceiver(s) 210 receives an incoming signal transmitted from an access point (such as a base station, WiFi router, or BLUETOOTH device) or other device of the network 102 (such as a WiFi, BLUETOOTH, cellular, 5G, LTE, LTE-A, WiMAX, or any other type of wireless network). The transceiver(s) 210 down-converts the incoming RF signal to generate an intermediate frequency or baseband signal. The intermediate frequency or baseband signal is sent to the RX processing circuitry 225 that generates a processed baseband signal by filtering, decoding, and/or digitizing the baseband or intermediate frequency signal. The RX processing circuitry 225 transmits the processed baseband signal to the speaker 230 (such as for voice data) or to the processor 240 for further processing (such as for web browsing data).

The TX processing circuitry 215 receives analog or digital voice data from the microphone 220 or other outgoing baseband data from the processor 240. The outgoing baseband data can include web data, e-mail, or interactive video game data. The TX processing circuitry 215 encodes, multiplexes, and/or digitizes the outgoing baseband data to generate a processed baseband or intermediate frequency signal. The transceiver(s) 210 receives the outgoing processed baseband or intermediate frequency signal from the TX processing circuitry 215 and up-converts the baseband or intermediate frequency signal to a signal that is transmitted.

The processor 240 can include one or more processors or other processing devices. The processor 240 can execute instructions that are stored in the memory 260, such as the OS 261 in order to control the overall operation of the electronic device 200. For example, the processor 240 could control the reception of forward channel signals and the transmission of reverse channel signals by the transceiver(s) 210, the RX processing circuitry 225, and the TX processing circuitry 215 in accordance with well-known principles. The processor 240 can include any suitable number(s) and type(s) of processors or other devices in any suitable arrangement. For example, in certain embodiments, the processor 240 includes at least one microprocessor or microcontroller. Example types of processor 240 include microprocessors, microcontrollers, digital signal processors, field programmable gate arrays, application specific integrated circuits, and discrete circuitry. In certain embodiments, the processor 240 can include a neural network.

The processor 240 is also capable of executing other processes and programs resident in the memory 260, such as operations that receive and store data. The processor 240 can move data into or out of the memory 260 as required by an executing process. In certain embodiments, the processor 240 is configured to execute the one or more applications 262 based on the OS 261 or in response to signals received from external source(s) or an operator. For example, applications 262 can include a multimedia player (such as a music player or a video player), a phone calling application, a virtual personal assistant, and the like.

The processor 240 is also coupled to the I/O interface 245 that provides the electronic device 200 with the ability to connect to other devices, such as client devices 106-114. The I/O interface 245 is the communication path between these accessories and the processor 240.

The processor 240 is also coupled to the input 250 and the display 255. The operator of the electronic device 200 can use the input 250 to enter data or inputs into the electronic device 200. The input 250 can be a keyboard, touchscreen, mouse, track ball, voice input, or other device capable of acting as a user interface to allow a user to interact with the electronic device 200. For example, the input 250 can include voice recognition processing, thereby allowing a user to input a voice command. In another example, the input 250 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 250 can be associated with the sensor(s) 265, a camera, and the like, which provide additional inputs to the processor 240. The input 250 can also include a control circuit. In the capacitive scheme, the input 250 can recognize touch or proximity.

The display 255 can be a liquid crystal display (LCD), light-emitting diode (LED) display, organic LED (OLED), active matrix OLED (AMOLED), or other display capable of rendering text and/or graphics, such as from websites, videos, games, images, and the like. The display 255 can be a singular display screen or multiple display screens capable of creating a stereoscopic display. In certain embodiments, the display 255 is a heads-up display (HUD).

The memory 260 is coupled to the processor 240. Part of the memory 260 could include a RAM, and another part of the memory 260 could include a Flash memory or other ROM. The memory 260 can include persistent storage (not shown) that represents any structure(s) capable of storing and facilitating retrieval of information (such as data, program code, and/or other suitable information). The memory 260 can contain one or more components or devices supporting longer-term storage of data, such as a read only memory, hard drive, Flash memory, or optical disc.

The electronic device 200 further includes one or more sensors 265 that can meter a physical quantity or detect an activation state of the electronic device 200 and convert metered or detected information into an electrical signal. For example, the sensor 265 can include one or more buttons for touch input, a camera, a gesture sensor, optical sensors, cameras, one or more inertial measurement units (IMUs), such as a gyroscope or gyro sensor, and an accelerometer. The sensor 265 can also include an air pressure sensor, a magnetic sensor or magnetometer, a grip sensor, a proximity sensor, an ambient light sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 265 can further include control circuits for controlling any of the sensors included therein. Any of these sensor(s) 265 may be located within the electronic device 200 or within a secondary device operably connected to the electronic device 200.

Although FIG. 2 illustrates one example of electronic device 200, various changes can be made to FIG. 2. For example, various components in FIG. 2 can be combined, further subdivided, or omitted and additional components can be added according to particular needs. As a particular example, the processor 240 can be divided into multiple processors, such as one or more central processing units (CPUs), one or more graphics processing units (GPUs), one or more neural networks, and the like. Also, while FIG. 2 illustrates the electronic device 200 configured as a mobile telephone, tablet, or smartphone, the electronic device 200 can be configured to operate as other types of mobile or stationary devices.

As discussed above, UWB technology has been recently introduced into consumer electronic devices, including smart phones, to provide spatial awareness capability, with applications such as indoor localization and device-to-device localization. More use cases are being developed to take advantage of this capability. One such use case is using UWB radar to measure distance from the radar to an object of interest in close range, at centimeter-level accuracy. Such capability is highly applicable, for example, as an alternative technology to the light-based TOF sensor, which is typically available only in high-end electronic devices due to the sensor's high cost.

Conventional pulse radar applications usually have the radar module at a stationary position to detect moving objects, in terms of position and velocity. The application of UWB radar for phone-to-target distance estimation is different from this traditional pulse radar usage: the target object is in a stationary position, while the UWB radar module embedded in the smart phone is moved towards or away from the object. In some cases, the phone can be kept still, however, this makes the received signal from the object of interest hard to distinguish from received signals from other static objects in the environment. Therefore, conventional distance estimation methods are unable to mitigate the impact of clutter (i.e., signals reflected from surrounding objects that are not of interest to the user). In addition, such conventional methods are unable to adapt to different phone speeds, environments, and objects, and are unable to provide continuous distance estimation.

To address these and other issues, this disclosure provides systems and methods for distance measurement to an object of interest in close range using UWB radar. As described in more detail below, the disclosed embodiments provide systems and methods that are able to robustly mitigate the impact of clutter (e.g., surrounding objects); adapt to different moving speeds, environments, and objects; and provide continuous distance estimations, even when there is minimal or no movement of the radar device.

The disclosed embodiments utilize multiple UWB-based distance estimation techniques and corresponding figures-of-merit (FOMs) to obtain a more accurate estimate of a distance between a radar device and a target object. One technique is based on the reflection energy from the object when the radar device is moving with moderate to fast speed in a forward or backward direction with respect to the object, and the other technique is based on finer scale phase tracking to handle distance measurement when the radar is moving more slowly or being held still.

To obtain the energy-based distance estimate, the radar device calculates a range profile and frequency profile based on a channel impulse response (CIR). When a dominant peak in the frequency profile is above a first threshold, the radar device estimates the energy-based distance based on the range profile. To obtain the phase-based distance estimate, the radar device obtains the following: (1) a clutter-removed CIR from the CIR using a high-pass filter; (2) a phase difference using range bins in the clutter-removed CIR that are closest to a previously estimated distance value; and (3) a relative distance change based on the phase difference. Thereafter, the radar device can estimate the phase-based distance based on the relative distance change and the previously estimated distance value.

Note that while some of the embodiments discussed below are described in the context of smart phones, these are merely examples. It will be understood that the principles of this disclosure may be implemented in any number of other suitable contexts or systems, including other portable electronic devices (e.g., tablets, laptops, and the like).

Figure 3:
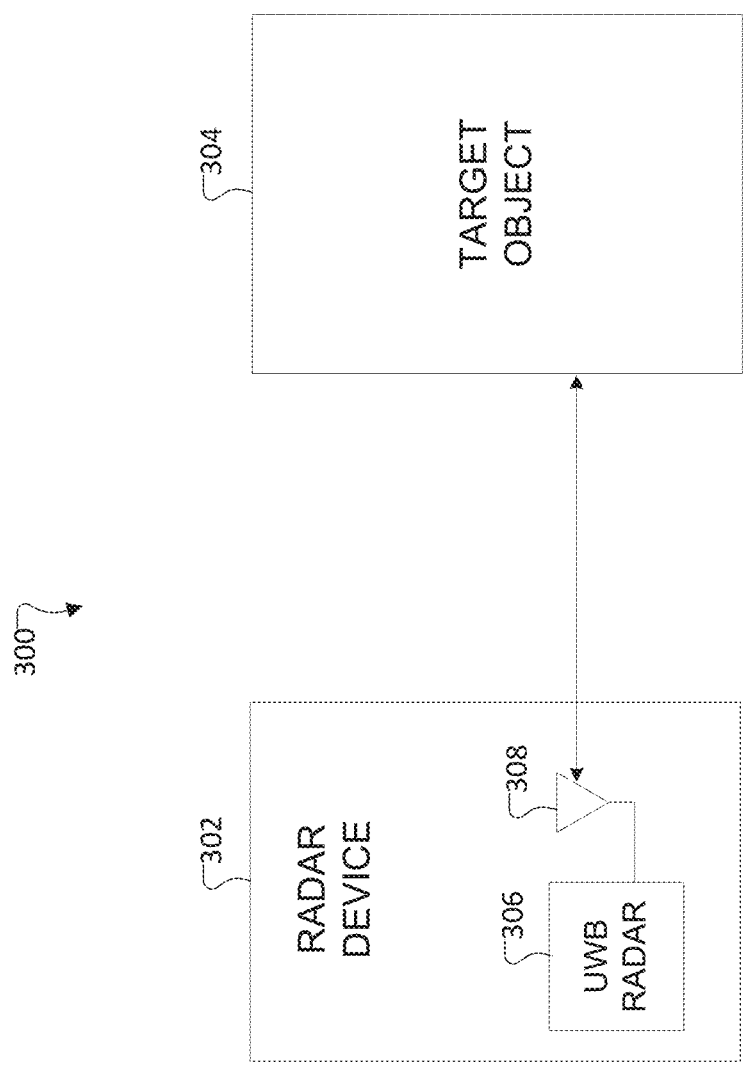
FIG. 3 illustrates an example system in which distance measurement of a target object in close range can be performed using UWB radar according to embodiments of the present disclosure.

FIG. 3 illustrates an example system 300 in which distance measurement of a target object in close range can be performed using UWB radar according to embodiments of the present disclosure. As shown in FIG. 3, the system 300 includes a radar device 302 and a target object 304. In this disclosure, the radar device 302 is an electronic device, such as the electronic device 200 of FIG. 2. In some embodiments, the radar device 302 is a smart phone. The radar device 302 is equipped with a UWB radar module 306 and one or more antennas 308 (which can represent, or be represented by, the transceiver 210). The radar module 306 can transmit a high-bandwidth pulse toward the target object 304, receive the signal reflected back from the target object 304, and compute the CIR, which is a signature of the target object 304 and the surrounding environment.

The antennas 308 are assumed to have a field-of-view similar to the direction of interest for the radar device 302, depending on applications. In an example where the radar device 302 is a smart phone (e.g., the smart phone 108), the antennas 308 can have a similar field of view as the rear-view camera lenses of the smart phone 302, in the case of distance measurement to support rear-view cameras. The antenna gain in the direction perpendicular to the rear surface of the smart phone 302 should be strongest, while the gain in other directions should be minimal. During usage, the smart phone 302 can move closer to the target object 304, move further away from the target object 304, or stay still, and the UWB radar module 306 will continuously monitor the signal bouncing back from the target object 304 and determine the device-to-target distance.

Figure 4:
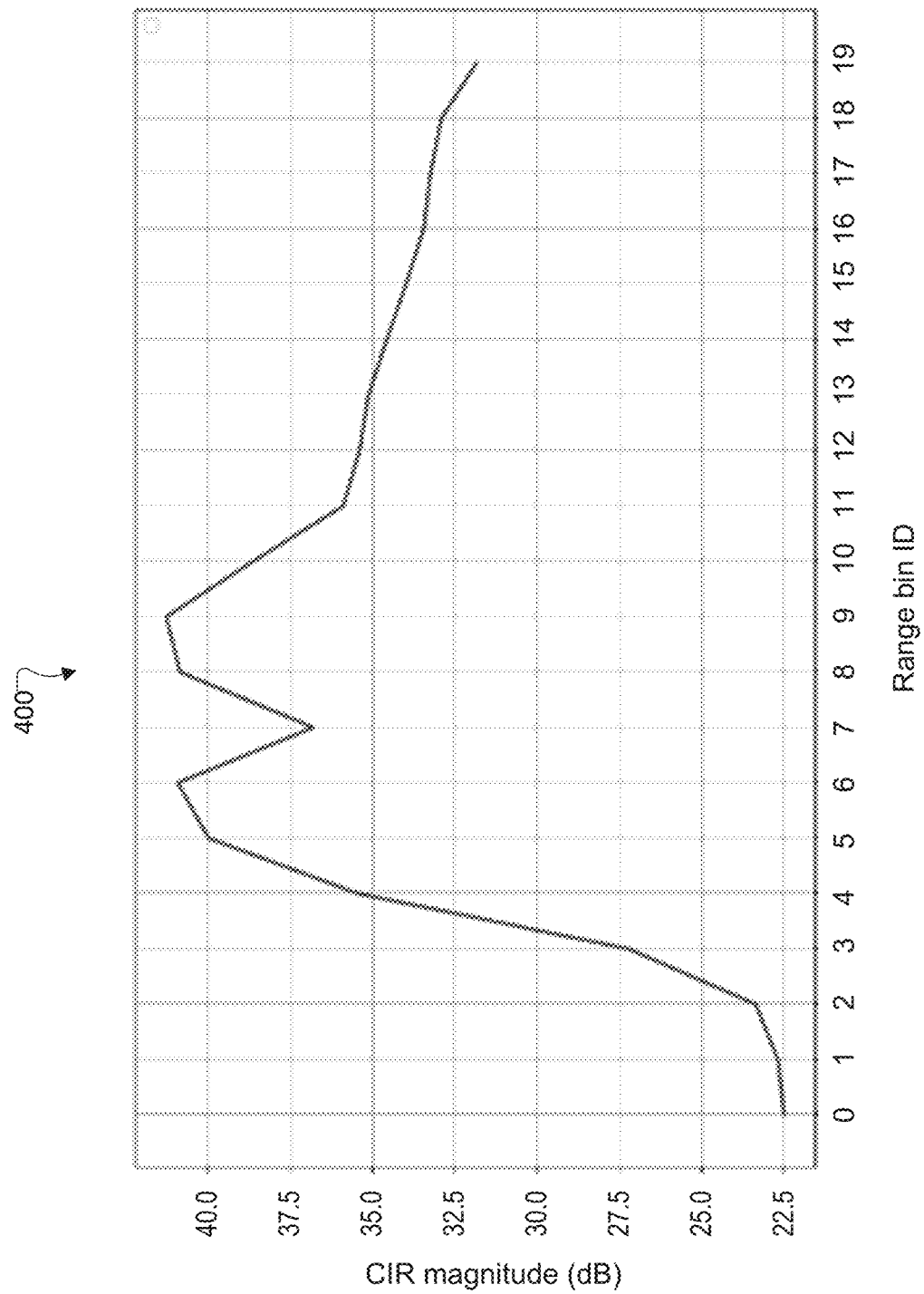
FIG. 4 illustrates a chart showing an example of channel impulse response (CIR) at one slow time index.

In an impulse radio ultra-wideband (IR-UWB) radar system, a UWB pulse is transmitted from a transmitter antenna, scattered by objects and the environment, and received on a receiver antenna. The received signal strength is typically dependent on the distance of target object 304 to the antennas 308 and the relative size of the target object 304. The CIR is estimated by the UWB radar module 306. The raw CIR can be denoted by h[n, m](m=1, 2, . . . , $N_r$) for the $n^{th}$ slow time index and the $m^{th}$ range bin on the receiver antenna, where $N_r$ is the number of range bins. FIG. 4 illustrates a chart 400 showing an example of CIR at one slow time index. Specifically, the chart 400 shows the CIR magnitude at each range bin.

Figure 5:
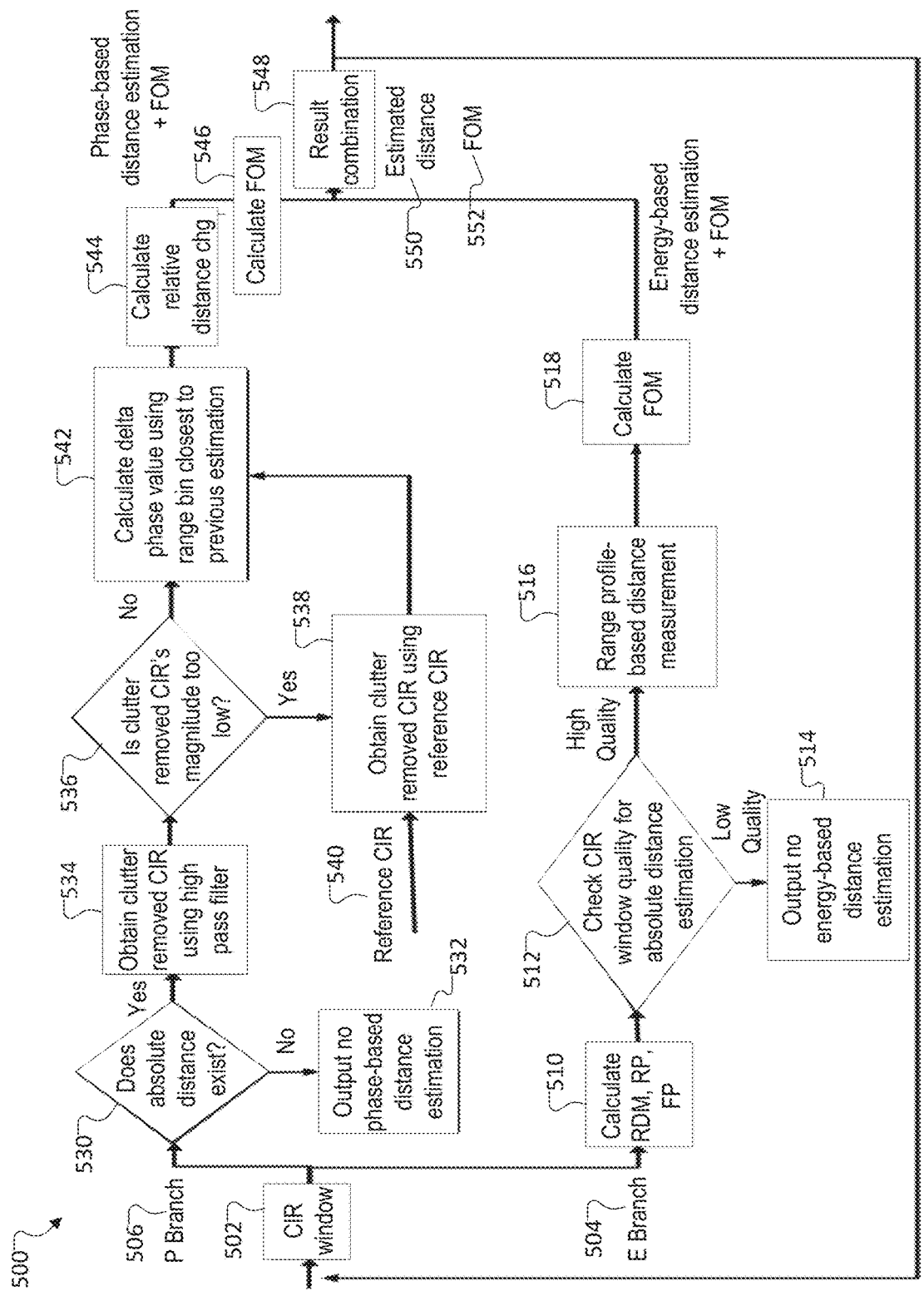
FIG. 5 illustrates an example process for distance measurement of a target in close range using UWB radar according to embodiments of the present disclosure.

FIG. 5 illustrates an example process 500 for distance measurement of a target in close range using UWB radar according to embodiments of the present disclosure. The embodiment of the process 500 shown in FIG. 5 is for illustration only. Other embodiments of the process 500 could be used without departing from the scope of this disclosure. For ease of explanation, the process 500 will be described as being implemented in the radar device 302 of FIG. 3, which can be a mobile device, such as a smart phone. However, the process 400 could be implemented in any other suitable device.

As shown in FIG. 5, the process 500 is performed on a moving window basis. At each time, the radar device 302 obtains the most recent CIR window 502 and provides the CIR window 502 as an input to the process 400. Then the radar device 302 generates an estimated device-to-target distance corresponding to the CIR window 502. The size of the CIR window 502 can be chosen to be long enough to capture movements. For example, for a UWB radar module with 200 Hz sampling rate, the window size can be 64 samples, making the window length approximately 0.25 seconds. Note that the window size is typically chosen to be a power of 2, for faster Fourier transform implementation on the radar device 302.

The process 500 combines two distance estimation techniques. One is based on CIR energy, and is referred to herein as the E-branch 504. The other is based on CIR phase, and is referred to herein as the P-branch 506. When the radar device 302 is moved towards or away from the target object 304 at moderate to high speed (for example, in one implementation, moderate to high speed is defined as when the radar device 302 is moved at more than 4 cm/s), the target object 304 can be easily identified on the Range Doppler Map (RDM), since its signature is well separated from the near-zero frequency clutter components. The E-branch 504 is performed in this case to estimate an absolute target distance.

In contrast, when the radar device 302 is moved slowly or not moved relative to the target object 304, the target signature appears at near-zero frequency and can be overwhelmed by clutter energy, making target detection less reliable. In this case, the P-branch 506 is performed, which is able to track sub-centimeter change in distance to the target object 304. Even though sensitive to small movement, the P-branch 506 can only determine relative distance change, thus the radar device 302 still uses an estimated absolute distance from the E-branch 504. The fusion of the two branches 504 and 506 provides a robust solution for distance measurement for different device movement speeds. In addition, both branches 504 and 506 have high-resolution distance estimation mechanisms to achieve sub-centimeter level accuracy, which is an improvement over conventional radar range resolution of only c/2BW=30 cm with current UWB radar bandwidth BW=500 MHz.

As described in greater detail below, the distance measurement can be accompanied by a FOM value, which indicates the reliability of the distance measurement. In some embodiments, the FOM value is in a range of 0 to 1, where a higher value indicates high reliability, and vice versa. Each branch (E-branch 504 or P-branch 506) has a distinct technique for calculating a FOM value for its distance estimation.

In the E-branch 504, the radar device 302 performs a calculation operation 510 to calculate the RDM, a frequency profile, and a range profile from the CIR window 502.

Figure 6:
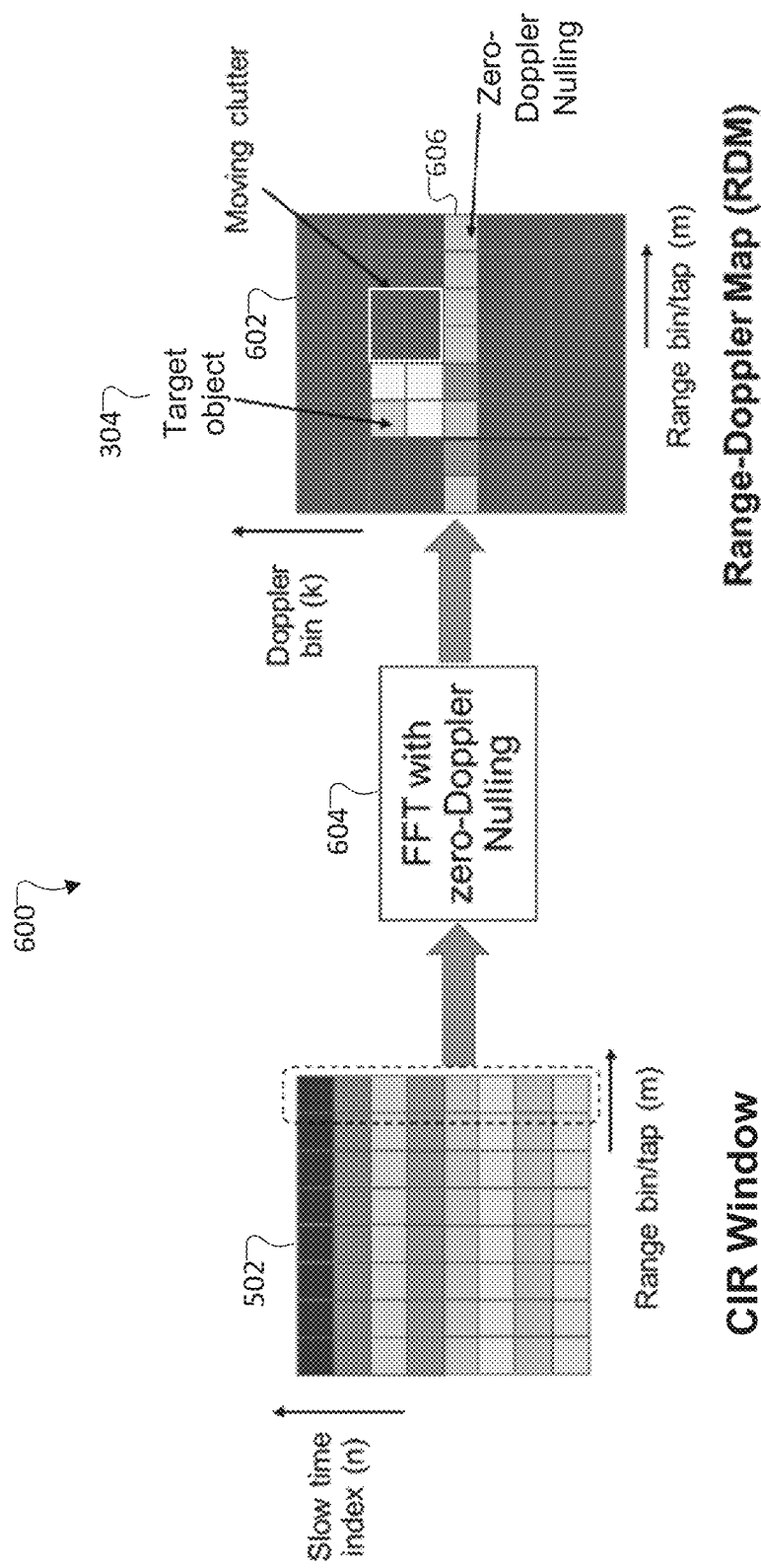
FIG. 6 illustrates an example process for calculating a Range Doppler Map (RDM) from a CIR window according to embodiments of the present disclosure.

FIG. 6 shows an example process 600 for calculating the RDM from the CIR window 502 according to embodiments of the present disclosure. The process 600 may be performed as part of the calculation operation 510. As shown in FIG. 6, the CIR window 502 is a raw CIR in the form of a two-dimensional (2D) matrix. In the 2D matrix, the 'x' dimension corresponds to the range bin (which represents the distance from the radar device 302 to the target object 304). The 'y' dimension corresponds to a slow time index (n).

The CIR window 502, which has a size $N_{FFT}$, is converted to a RDM 602 by applying a Fast Fourier Transform (FFT) operation 604 across the slow-time index n, such as by the following:

$$RDM[k, m] = \sum_{p=0}^{N_{FFT}-1} h[p, m]e^{-\frac{j2\pi pk}{N_{FFT}}} \text{ for } k \in \mathcal{K} = \left\{-\frac{N_{FFT}}{2}, \frac{N_{FFT}}{2}-1, \ldots, \frac{N_{FFT}}{2}-2, \frac{N_{FFT}}{2}-1\right\}.$$

The resulting RDM 602 is a 2D map where the 'x' dimension corresponds to the range bin (which represents the distance from the radar device 302 to the target object 304), and the 'y' dimension corresponds to Doppler frequency, which can be translated to velocity. The zero-frequency component 606 of the RDM 602 (i.e., the Doppler bin corresponding to zero velocity) is set to zero (i.e., zero-Doppler nulling) in order to remove the non-moving (i.e., stationary) clutter components. The target object 304 can then be observed in the RDM 602 as a group of cells that have higher energy.

Figure 7:
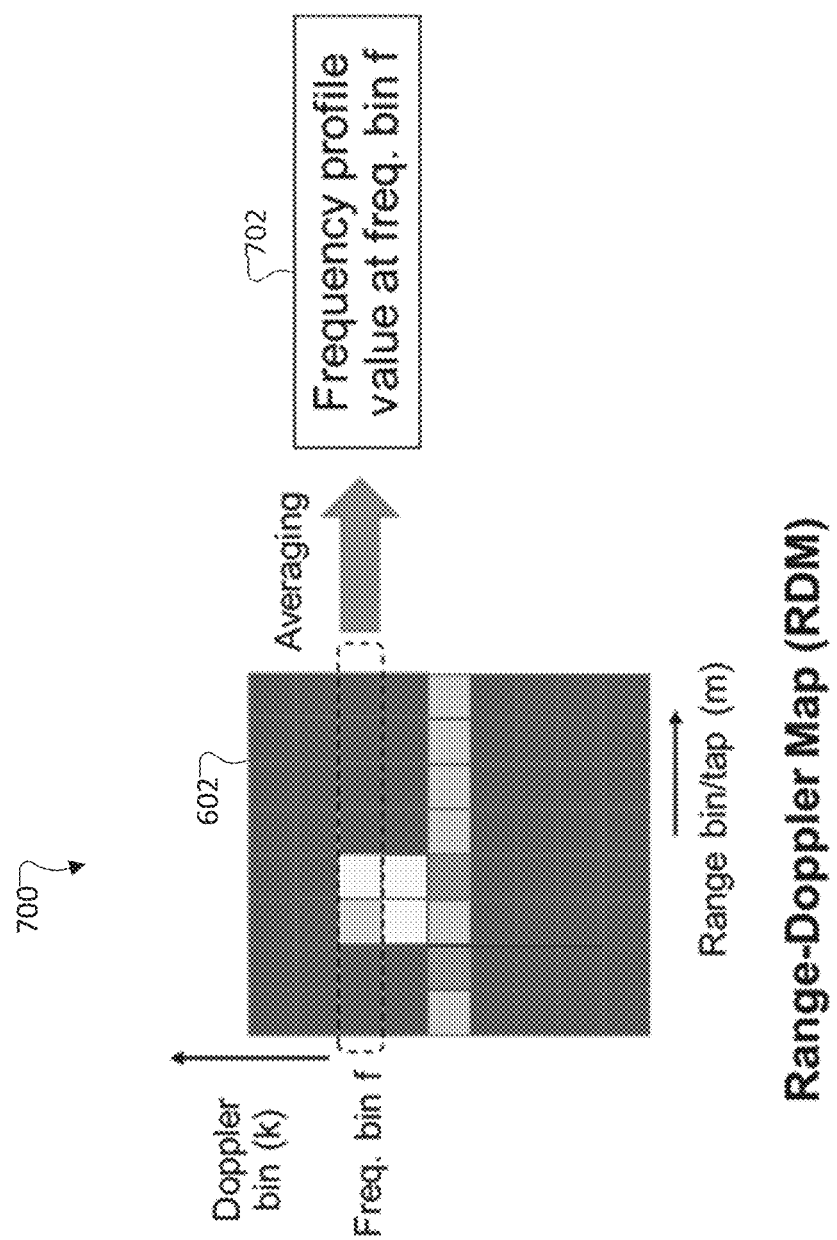
FIG. 7 illustrates an example process for calculating a frequency profile from a RDM according to embodiments of the present disclosure.

FIG. 7 shows an example process 700 for calculating the frequency profile from the RDM 602 according to embodiments of the present disclosure. The process 700 may be performed as part of the calculation operation 510. As shown in FIG. 7, from the zero-nulling RDM 602, the radar device 302 calculates the frequency profile (FP) 702 by taking the average of the energy of the first $N_r$ range bins (corresponding to close distance) for each frequency component (f) of the RDM 602, such as by the following:

$$FP(f) = \frac{1}{N_r} \sum_{r=startidx}^{endidx} |RDM[f, r]|^2, \text{ for } f \in \mathcal{K}.$$

Figure 8:
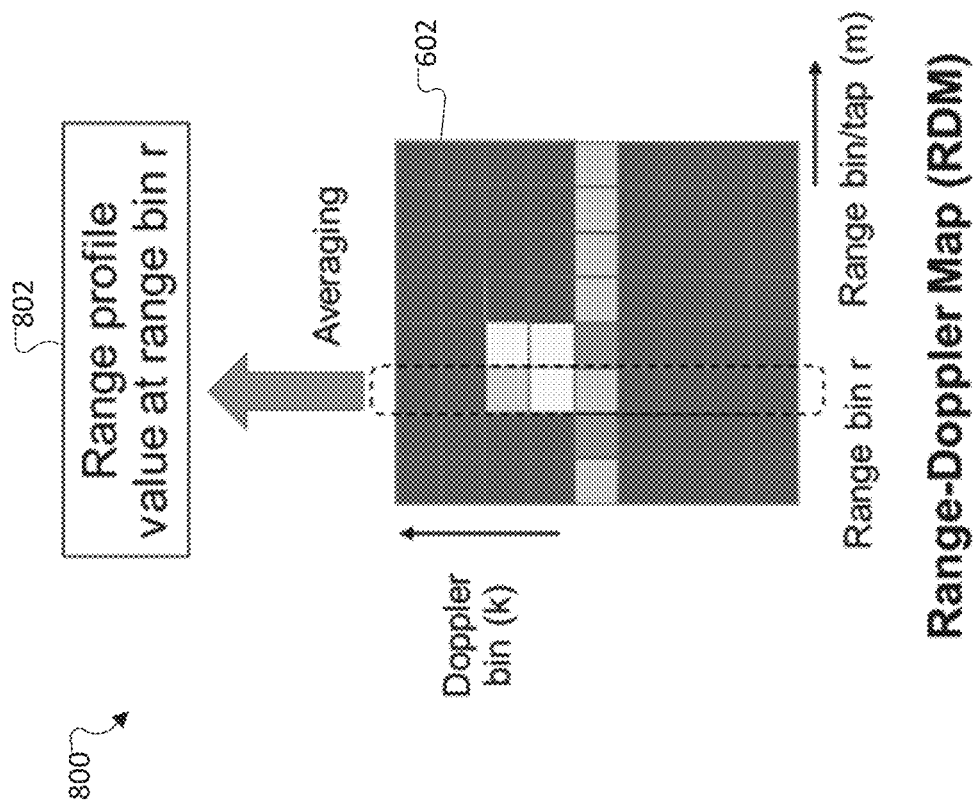
FIG. 8 illustrates an example process for calculating a range profile from the RDM according to embodiments of the present disclosure.

FIG. 8 illustrates an example process 800 for calculating the range profile from the RDM 602 according to embodiments of the present disclosure. The process 800 may be performed as part of the calculation operation 510. As shown in FIG. 8, from the zero-nulling RDM 602, the radar device 302 calculates the range profile (RP) 802 by taking an average of the energy of all $N_{FFT}$ frequency bins for each range bin (r) of the RDM 602, such as by the following:

$$RP(r) = \frac{1}{N_{FFT}} \sum_{d=-\frac{N_{FFT}}{2}}^{\frac{N_{FFT}}{2}-1} |RDM[d, r]|^2, \text{ for } r \in [1, \ldots, N_r].$$

Figure 9:
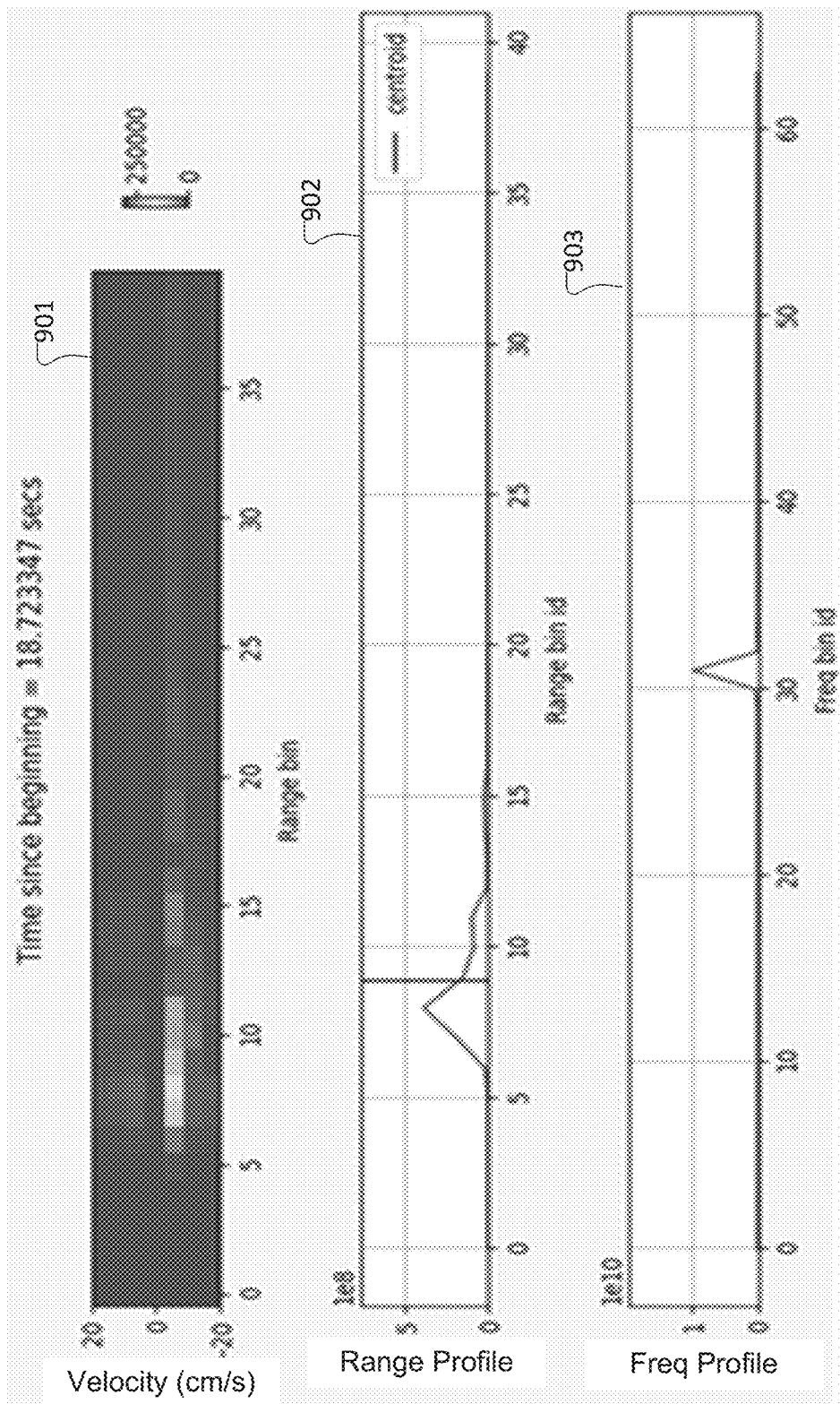
FIG. 9 illustrates charts showing examples of the RDM, the range profile, and the frequency profile according to embodiments of the present disclosure.

FIG. 9 illustrates charts 901-903 showing examples of the RDM 602, the range profile 802, and the frequency profile 702 according to embodiments of the present disclosure. The data in the charts is representative of RDM, range profile, and frequency profile values that may be obtained after the calculation operation 510 is performed. The chart 901 shows the zero-Doppler nulled RDM 602, the chart 902 shows the corresponding range profile 802, and the chart 903 shows the corresponding frequency profile 702. In this example, the RDM 602 has 64 frequency bins and 40 range bins. Of course, this is merely one example; other quantities of frequency bins and range bins are possible are within the scope of this disclosure.

Returning to FIG. 5, once the RDM 602, the range profile 802, and the frequency profile 702 have been calculated in operation 510, the radar device 302 performs operation 512 to check the CIR window quality for absolute distance estimation. In some embodiments, the E-branch 504 estimates absolute distance only when the CIR window 502 has sufficiently high quality, in terms of containing high enough forward or backward velocity.

In one embodiment, the radar device 302 checks the CIR window quality in operation 512 by detecting if the corresponding frequency profile 702 has a dominant peak on either the positive velocity side or the negative velocity side. For example, in some embodiments, the radar device 302 first determines the highest peak value $fp_{max}$ in the frequency profile 702. Then the radar device 302 sets a threshold $fp_{threshold}$ based on the highest peak value. For example, the threshold may be defined as $fp_{threshold} = fp_{max}/20$. After that, the radar device 302 collects all peaks on the frequency profile 702 that have a higher value than $fp_{threshold}$. If all of the collected peaks lie on only the positive velocity side or only the negative velocity side, then the radar device 302 determines that the CIR window 502 has high quality for determining absolute distance. In this case, the E-branch 504 can continue to operation 516. Otherwise, the radar device 302 determines that the CIR window 502 has low quality and cannot be used for calculating absolute distance. In this case, at operation 514, the radar device 302 outputs no energy-based distance estimation.

In another embodiment, the radar device 302 checks the CIR window quality in operation 512 by estimating the radial velocity of the radar device 302 towards or away from the target object 304. From the frequency profile 702, the radar device 302 chooses the frequency with maximum value $f_{max} = \text{argmax}(fp)$. Then, the radar device 302 converts $f_{max}$ to the assumed velocity $v_{max}$ of the radar device 302. For example, the radar device 302 may determine $v_{max}$ using the following equation:

$$v_{max} = \frac{f_{max}}{2 f_{center}} * c,$$

where $f_{center}$ is the center frequency of the UWB band (e.g., 8 GHz for UWB channel 9) and c is the speed of light ($3*10^8$ m/s). In some embodiments, $v_{max}$ is in units of m/s, and $f_{max}$ is in units of Hz. Based on the velocity $v_{max}$, the radar device 302 determines that the CIR window 502 has high quality for absolute distance estimation if the velocity $v_{max}$ is higher than a preselected threshold. In this case, the E-branch 504 can continue to operation 516. Otherwise, the radar device 302 determines that the CIR window 502 has low quality and cannot be used for calculating absolute distance. In this case, at operation 514, the radar device 302 outputs no energy-based distance estimation.

Once the radar device 302 determines that the CIR window quality is sufficiently high, the radar device 302 performs a range profile-based distance estimation operation 516. In the estimation operation 516, the radar device 302 estimates the target distance from the range profile 802. The underlying UWB firmware can provide the range bin corresponding to the zero distance; this range bin is referred to herein as calibidx. Depending on the range bin resolution and the maximum distance the ranging application requires to detect, the radar device 302 selects a number of range bins after the calibidx for the peak finding operation. In one example implementation, when the range bin resolution is 15 cm, and the application wants to cover a range of 60 cm, 4 range bins after the calibidx would be investigated (60 cm/15 cm=4). The radar device 302 performs the peak finding operation on the chosen range bins and outputs the range bin with maximum magnitude; this range bin is referred to herein as maxidx.

In the event that the range bin resolution is not fine enough to satisfy the application requirement (e.g., when the range bin resolution is 15 cm, while the application requires +/−5 cm accuracy), the radar device 302 can perform an interpolation operation to increase the resolution. In some embodiments, a quadratic 3-point interpolation can be used. For example, from the range profile values of the range bin maxidx and its two neighbors maxidx−1 and maxidx+1, three 2D points can be obtained:

$A1$(maxidx−1,RP[maxidx−1]), $A2$(maxidx,RP[maxidx]), $A3$(maxidx+1,RP[maxidx+1]).

Then a quadratic function can be used in the form of $y=ax^2+bx+c$ that passes these 3 points, in which a, b, c are parameters to be found. Once a, b, c are found, the range profile for finer indices from maxidx−1 to maxidx+1, such as (maxidx−1, maxidx−0.9, maxidx-0.8, . . . , maxidx+0.8, maxidx+0.9, maxidx+1) can be estimated. The radar device 302 can again use the peak finding to find the finer peak index, referred to herein as finermaxidx. The target distance can then be estimated as (finermaxidx−calibidx)*range_bin_resolution.

In some embodiments, the per-window distance estimations can fluctuate over time, so an additional filter, such as a Kalman filter or a particle filter, can be added to the distance estimation operation 516. In some embodiments, a Kalman filter can be used as follows.

The state vector is defined as $x_t=[x_t, v_t]^T$, where $x_t$, $v_t$ represent the one-dimensional position and velocity of the radar device 302 with respect to the target object 304. The observation is $z_t=[d_{est,t}, v_{est,t}]^T$, where $d_{est,t}$ is the per-window distance measurement (which can be obtained using a phase difference calculation, such as described below) and $v_{est,t}$ is the estimated current velocity (which can be obtained as described above).

The mapping between measurements and states can be given as:

$z_t = Hx_t$, where $$H = \begin{bmatrix} 1 & 0 \\ 0 & 1 \end{bmatrix}.$$

The state transition equation is defined as $x_t = A x_{t-1} + w_t$, where the state transition model is $$A = \begin{bmatrix} 1 & \Delta t \\ 0 & 1 \end{bmatrix},$$

and $w_t$ is the process noise ($w_t \sim N(0, \sigma_a^2)$).

In the prediction step:

$\hat{x}_t = A X_{t-1}$ $\hat{P}_t = A P_{t-1} A^T + Q$

In the update step:

$y_t = z_t - H\hat{x}_t$ $K_t = \hat{P}_t H_t^T (H_t \hat{P}_t H_t^T + R)^{-1}$ $x_t = \hat{x}_t + K_t y_t$ $P_t = (I - K_t H_t) \hat{P}_t$ In the previous equations, Q is the process noise covariance, P is the error covariance matrix, R is the measurement noise covariance matrix, K is the Kalman gain, and H is the Jacobian matrix.

In addition to the range profile-based distance estimation, the radar device 302 also performs a figure-of-merit (FOM) calculation 518 for the E-branch 504. The distance estimation in the E-branch 504 is based on energy of the reflected signal from the target object 304; hence, the FOM calculation 518 can be performed using the received signal strength. In some embodiments, the radar device 302 calculates the signal-to-noise ratio (SNR) value by the following:

$$SNR = \frac{\max[RDM[:, startidx:stopidx]]}{\text{median}[RDM]}$$

where max[RDM [:, startidx: stopidx]] is the maximum cell value of the region of the first few range bins (between range bin startidx and range bin stopidx) in the RDM 602, and median[RDM] is the median cell value of the RDM 602, which represents the noise level.

The radar device 302 then converts the SNR to the FOM value based on its value with respect to a possible range of SNR for common objects at different distances, such as by the following:

$$FOM = \frac{SNR - \text{minSNR}}{\text{maxSNR} - \text{minSNR}}$$

where minSNR and maxSNR values are set empirically.

Turning now to the P-branch 506 of the process 500, as discussed above, the P-branch 506 is based on the CIR phase. The P-branch 506 uses the CIR phase difference to calculate a relative distance change, then uses a previously determined absolute distance to determine the current absolute distance. First, in operation 530, the radar device 302 determines if an absolute distance exists, either from a previous estimation from the E-branch 504, or from multiple previous steps from the P-branch 506, in which absolute distance is calculated from aggregating relative distance change in each step. If the radar device 302 determines that no absolute distance exists, then at operation 532, the radar device 302 outputs no phase-based distance estimation. Otherwise, the P-branch 506 can continued to operation 534.

In operation 534, the radar device 302 performs clutter removal. The raw CIR window 502 is denoted by h[n, m] (m=1, 2, ..., $N_r$) for the $n^{th}$ slow time index and the $m^{th}$ range bin on the receive antenna, where $N_r$ is the number of range bins. In some embodiments, the radar device 302 can use a high-pass filter to suppress the clutter components. The high-pass filter discards low frequency components (typically caused by clutter) to help extract the signal of interest for subsequent processing steps. In some embodiments, the radar device 302 uses a high-pass infinite impulse response (IIR)-based filter to suppress the clutter components. In the time domain, the clutter-removed CIR $h_c$ can be calculated as follows:

$c[n,m] = \alpha c[n-1,m] + (1-\alpha) h[n,m]$ $h_c[n,m] = h[n,m] - c[n,m]$ where $\alpha$ is the clutter filter parameter that controls the high pass filter response. In some embodiments, $\alpha$ is within the range from 0 to 1.

Figure 10:
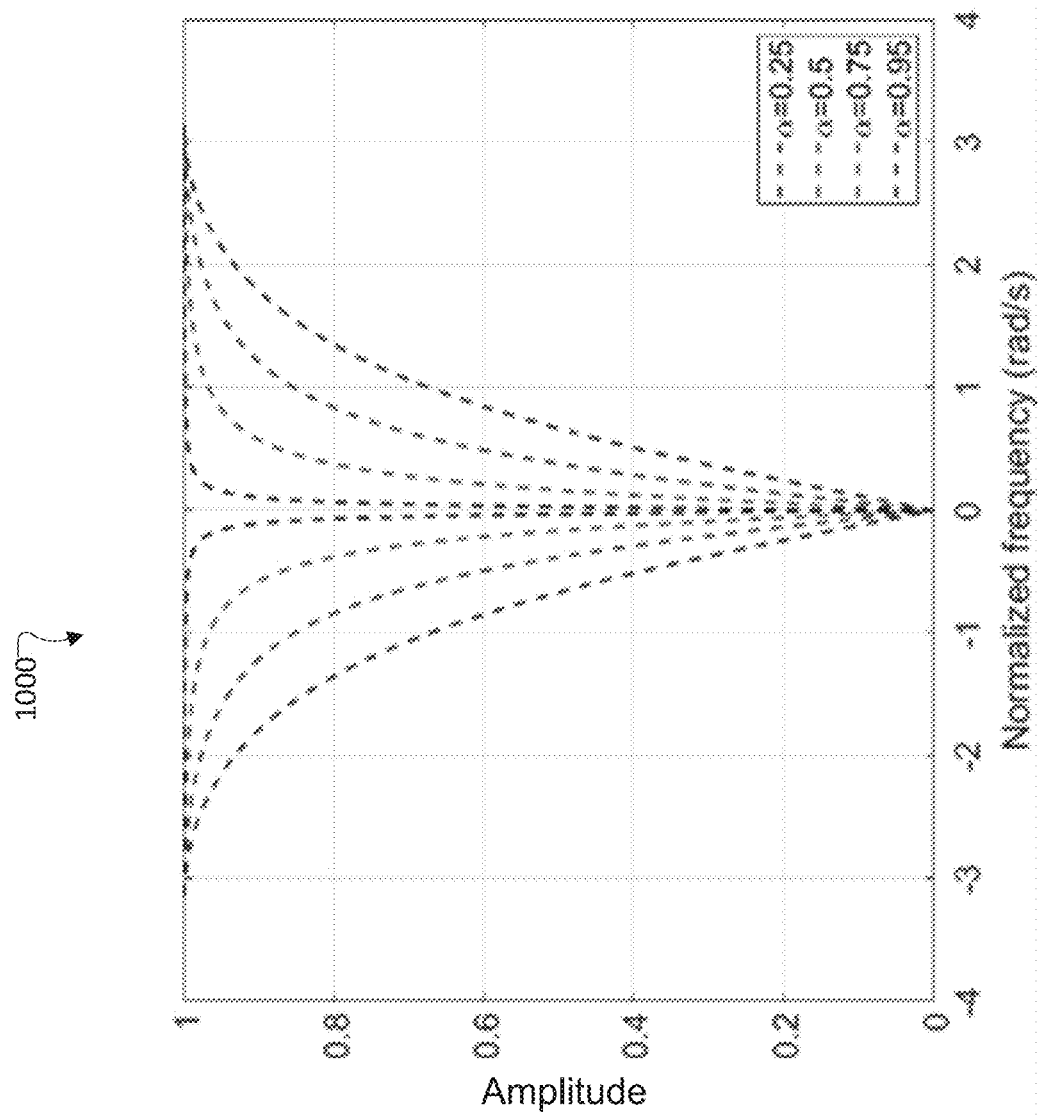
FIG. 10 illustrates a chart showing the frequency response of an example high-pass filter for different clutter filter parameter values, according to embodiments of the present disclosure.

FIG. 10 illustrates a chart 1000 showing the frequency response of an example high-pass IIR filter for different clutter filter parameter values, according to embodiments of the present disclosure. The higher $\alpha$ is, the lower the cut-off frequency of the high-pass filter is. Since in the static case, the micromovement also has quite low frequency, the high pass filter should have low cut off frequency to create an opportunity to leave micromovement information for the next processing steps. As a result, in some embodiments, a good range of $\alpha$ for target distance estimation is 0.99 to 1. However, other values are possible and within the scope of this disclosure.

A limitation of using high-pass IIR filter for clutter removal is that the magnitude of the output clutter removed CIR can decrease fast when the radar device 302 starts moving. The low-magnitude clutter removed CIR can causes inaccuracy in the phase calculation in the next step. Thus, an additional layer of clutter removal can be added when the clutter-removed CIR magnitude is too low. In some embodiments, the radar device 302 performs operation 536 to determine if the clutter-removed CIR magnitude is too low, such as by comparing the clutter-removed CIR magnitude to a pre-determined threshold (which may be determined empirically). If the radar device 302 determines that the clutter-removed CIR magnitude is too low, then the radar device 302 performs operation 538 to calculate a new clutter-removed CIR. The new clutter-removed CIR is calculated by subtracting the current input CIR window 502 with a reference CIR 540. The reference CIR 540 can be updated periodically as an estimation of recent clutter environment. In one implementation, when the sampling frequency of the radar is 200 Hz, after every 100 CIRs (corresponding to 0.5 secs), the latest CIR window 502 is used as the reference CIR 540. This technique for removing clutter produces higher clutter-removed CIR magnitude than previous techniques.

Next, at operation 542, the radar device 302 calculates the delta phase value using the range bin closest to the previous estimation. The radar device 302 uses the CIR complex value (consisting of real (I) and imaginary (Q) components) for the range bin corresponding to the previous estimated distance to calculate the phase:

$$\phi_t = \mathrm{atan}\left(\frac{Q}{I}\right).$$

At operation 544, the radar device 302 calculates the change in relative distance. The phase differences between two consecutive CIRs $d\phi_t=\phi_t-\phi_{t-1}$ are used to calculate the distance change:

$$dr_t = \frac{d\phi_t}{2\pi}D,$$

where D is delta-distance when the phase changes a full cycle (e.g., D=1.875 cm for UWB Ch9). The distance change $dr_t$ is then added to previous distance estimation to get the current phase-based distance estimation. To avoid the phase-wrap causing ambiguity, the distance obtained using the P-branch 506 should be used when the velocity is less than 1.875 m/s (for 200 Hz CIR).

In addition to the phase-based distance estimation, the radar device 302 also performs a FOM calculation 546 for the P-branch 506. The distance estimation in the P-branch 506 is based on the phase difference between consecutive CIRs to determine the relative moving distance, then the distance differences are added at each time step on top of a previously known absolute distance. At each timestep, the phase difference can have small errors, either by inherent device noise or by the small misalignment between the radar device's moving direction and the target object 304. Thus, over time, the distance estimations from the P-branch 506 can accumulate larger errors, and become less reliable. To capture this reliability indicator in the FOM calculation 546 for the P-branch 506, the radar device 302 can use an exponential decay function. In some embodiments, the FOM value at time step t can be calculated from the FOM value at previous time step t−1, as given by the following:

$$FOM_t = FOM_{t-1} * 2^{-1/t_{1/2}}$$

where $t_{1/2}$ is the half-life time constant (in the number of time steps). The half-life time constant represents the number of CIR it would take to reduce the initial FOM value by half. This time constant can be chosen manually, e.g., by an upper layer application. Optionally, the FOM can be set to decay faster (such as increase the half-life time constant by K times) if the radar device 302 detects certain conditions in which the phase tracking is known to not work well (such as sudden phone movements to another direction or object).

At operation 548, the radar device 302 can perform a result combination. There are different techniques for the radar device 302 to combine the distance estimations and FOMs from the E-branch 504 and the P-branch 506. In some embodiments, when there is a distance estimation obtained from the E-branch 504, the radar device 302 uses this distance estimation and its FOM for the final estimated distance 550 and the corresponding final FOM 552. Otherwise, when the E-branch 504 produces no estimation (such as at operation 514), the radar device 302 uses the distance estimation and FOM from the P-branch 506 for the final estimated distance 550 and the final FOM 552.

In other embodiments, the radar device 302 performs both the E-branch 504 and the P-branch 506 concurrently, and at each time step, the final estimated distance 550 and the final FOM 552 can be the average of the distance and FOM values coming from the two branches, such as given by the following:

$$distance_{out} = \frac{distance_E + distance_P}{2}$$

$$FOM_{out} = \frac{FOM_E + FOM_P}{2}$$

Although FIGS. 5 through 10 illustrate an example of a process 500 for distance measurement of a target in close range using UWB radar and related details, various changes may be made to FIGS. 5 through 10. For example, while the radar device 302 is sometimes described as a smart phone, the procedure described in this disclosure can be applied to other types of mobile electronic devices. Also, various components in FIGS. 5 through 10 could be combined, further subdivided, or omitted and additional components could be added according to particular needs. In addition, various operations in FIGS. 5 through 10 could overlap, occur in parallel, occur in a different order, or occur any number of times.

The disclosed embodiments can be used in a variety of use cases. For example, the disclosed embodiments could be used in AR/VR applications executing on a smart phone or other device. In such applications, distance estimation can be useful where the phone's spatial awareness of the objects in front is necessary. In some embodiments, the disclosed algorithm can be configured as an API to provide current distance and reliability (FOM) information for these applications.

As another example, the disclosed embodiments could be used to support camera switching applications. With growing interest in mobile photography, current smart phones are equipped with an array of camera lenses to serve different photography modes, such as ultrawide angle, wide angle, tele-zoom, and the like. Although the mode can be manually chosen by users, it could be helpful for the disclosed embodiments to be used for intelligent camera switching based on the distance between the camera and the object in the camera's field of view. For example, when the object is within 10 cm, the phone switches to ultrawide camera lenses; when the object is further than 10 cm, the phone switches to wide camera lenses.

Figure 11:
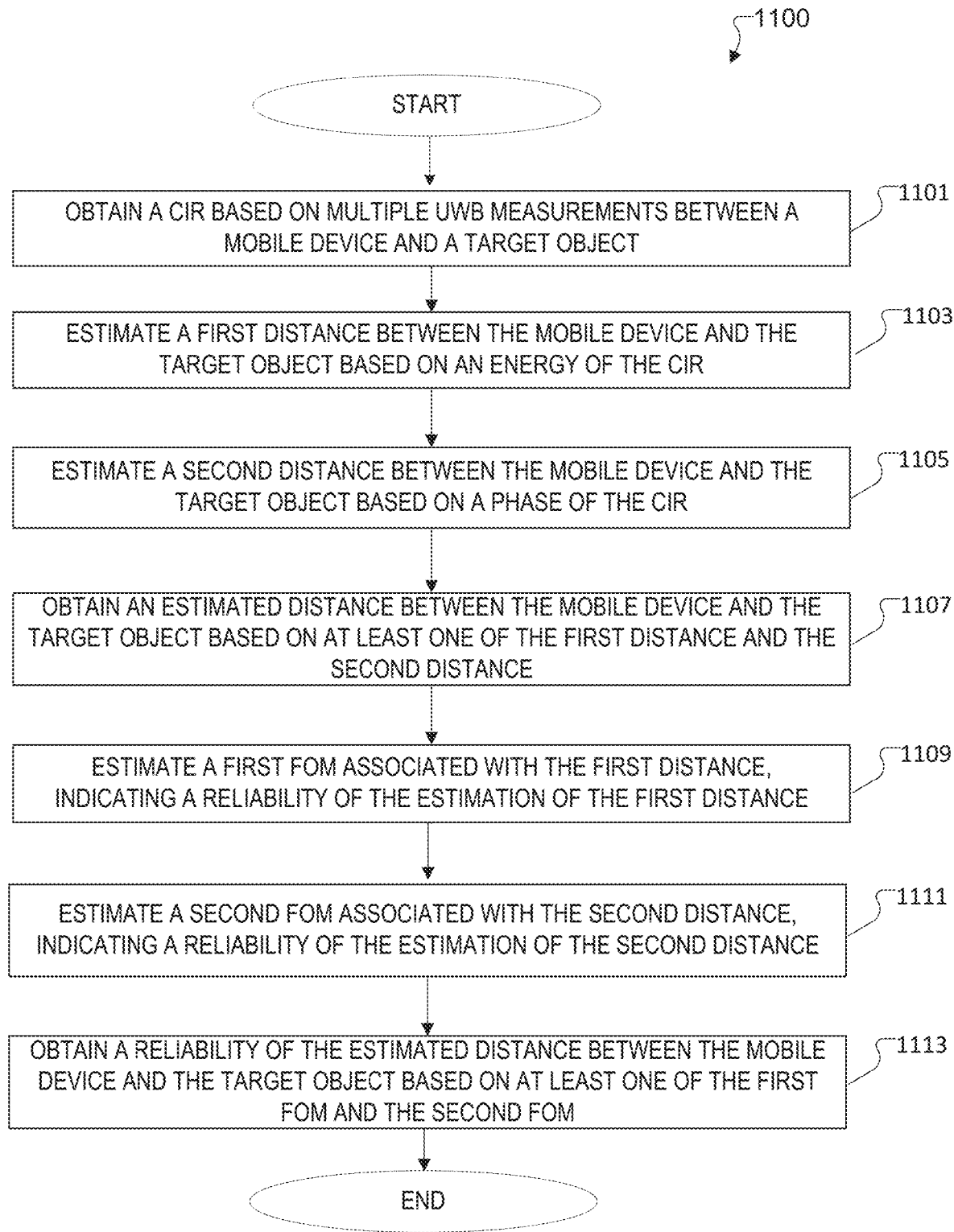
FIG. 11 illustrates a flow chart of a method for distance measurement of a target in close range using UWB radar according to embodiments of the present disclosure.

FIG. 11 illustrates a flow chart of a method 1100 for distance measurement of a target in close range using UWB radar according to embodiments of the present disclosure, as may be performed by a mobile device (e.g., the radar device 302). The embodiment of the method 1100 shown in FIG. 11 is for illustration only. One or more of the components illustrated in FIG. 11 can be implemented in specialized circuitry configured to perform the noted functions, or one or more of the components can be implemented by one or more processors executing instructions to perform the noted functions.

As illustrated in FIG. 11, the method 1100 begins at step 1101. At step 1101, a mobile device obtains a CIR based on multiple UWB measurements between the mobile device and a target object. This could include, for example, the radar device 302 obtaining the CIR window 502 based on UWB measurements between the radar device 302 and the target object 304, such as described in the process 500.

At step 1103, the mobile device estimates a first distance between the mobile device and the target object based on an energy of the CIR. This could include, for example, the radar device 302 performing the E-branch 504 of the process 500 to estimate a range profile-based distance between the radar device 302 and the target object 304.

At step 1105, the mobile device estimates a second distance between the mobile device and the target object based on a phase of the CIR. This could include, for example, the radar device 302 performing the P-branch 506 of the process 500 to estimate a distance between the radar device 302 and the target object 304 based on a phase of the CIR.

At step 1107, the mobile device obtains an estimated distance between the mobile device and the target object based on at least one of the first distance and the second distance. This could include, for example, the radar device 302 performing operation 548 to obtain a result combination that includes a final estimated distance 550.

At step 1109, the mobile device estimates a first FOM associated with the first distance, where the first FOM indicates a reliability of the estimation of the first distance. This could include, for example, the radar device 302 performing the FOM calculation 518 to estimate a FOM associated with the estimated distance from the E-branch 504.

At step 1111, the mobile device estimates a second FOM associated with the second distance, where the second FOM indicates a reliability of the estimation of the second distance. This could include, for example, the radar device 302 performing the FOM calculation 546 to estimate a FOM associated with the estimated distance from the P-branch 506.

At step 1113, the mobile device obtain a reliability of the estimated distance between the mobile device and the target object based on at least one of the first FOM and the second FOM. This could include, for example, the radar device 302 performing operation 548 to obtain a result combination that includes a final FOM 552.

Although FIG. 11 illustrates one example of a method 1100 for distance measurement of a target in close range using UWB radar, various changes may be made to FIG. 11. For example, while shown as a series of steps, various steps in FIG. 11 could overlap, occur in parallel, occur in a different order, or occur any number of times.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:
   obtaining a channel impulse response (CIR) based on multiple ultrawide band (UWB) measurements between a mobile device and a target object;
   calculating a range profile and frequency profile based on the CIR;
   in response to determining that a dominant peak in the frequency profile is above a first predetermined threshold, estimating a first distance between the mobile device and the target object based on the range profile;
   estimating a second distance between the mobile device and the target object based on a phase of the CIR; and
   obtaining an estimated distance between the mobile device and the target object based on at least one of the first distance and the second distance.

2. The method of claim 1, wherein obtaining the estimated distance between the mobile device and the target object comprises:
   calculating the estimated distance as an average of the first distance and the second distance.

3. The method of claim 1, wherein obtaining the estimated distance between the mobile device and the target object comprises:
   in response to determining that a velocity of the mobile device is greater than a second predetermined threshold, setting the estimated distance to be equal to the first distance; and
   in response to determining that the velocity of the mobile device is less than or equal to the second predetermined threshold, setting the estimated distance to be equal to the second distance.

4. The method of claim 1, wherein estimating the second distance comprises:
   obtaining a clutter-removed CIR from the CIR using a high-pass filter;
   obtaining a phase difference using range bins in the clutter-removed CIR that are closest to a previously estimated distance value;
   obtaining a relative distance change based on the phase difference; and
   estimating the second distance based on the relative distance change and the previously estimated distance value.

5. The method of claim 1, further comprising:
   estimating a first figure of merit (FOM) associated with the first distance, the first FOM indicating a reliability of the estimation of the first distance;
   estimating a second FOM associated with the second distance, the second FOM indicating a reliability of the estimation of the second distance; and
   obtaining a reliability of the estimated distance between the mobile device and the target object based on at least one of the first FOM and the second FOM.

6. The method of claim 5, wherein:
   estimating the first FOM comprises calculating the first FOM based on a signal-to-noise ratio (SNR) of a signal reflected from the target object; and
   estimating the second FOM comprises calculating the second FOM using an exponential decay function.

7. A device comprising:
   a transceiver; and
   a processor operably connected to the transceiver, the processor configured to:
   obtain a channel impulse response (CIR) based on multiple ultrawide band (UWB) measurements between a mobile device and a target object;
   calculate a range profile and frequency profile based on the CIR;
   in response to determining that a dominant peak in the frequency profile is above a first predetermined threshold, estimate a first distance between the mobile device and the target object based on the range profile;
   estimate a second distance between the mobile device and the target object based on a phase of the CIR; and obtain an estimated distance between the mobile device and the target object based on at least one of the first distance and the second distance.

8. The device of claim 7, wherein to obtain the estimated distance between the mobile device and the target object, the processor is configured to:
calculate the estimated distance as an average of the first distance and the second distance.

9. The device of claim 7, wherein to obtain the estimated distance between the mobile device and the target object, the processor is configured to:
in response to determining that a velocity of the mobile device is greater than a second predetermined threshold, set the estimated distance to be equal to the first distance; and
in response to determining that the velocity of the mobile device is less than or equal to the second predetermined threshold, set the estimated distance to be equal to the second distance.

10. The device of claim 7, wherein to estimate the second distance, the processor is configured to:
obtain a clutter-removed CIR from the CIR using a high-pass filter;
obtain a phase difference using range bins in the clutter-removed CIR that are closest to a previously estimated distance value;
obtain a relative distance change based on the phase difference; and
estimate the second distance based on the relative distance change and the previously estimated distance value.

11. The device of claim 7, wherein the processor is further configured to:
estimate a first figure of merit (FOM) associated with the first distance, the first FOM indicating a reliability of the estimation of the first distance;
estimate a second FOM associated with the second distance, the second FOM indicating a reliability of the estimation of the second distance; and
obtain a reliability of the estimated distance between the mobile device and the target object based on at least one of the first FOM and the second FOM.

12. The device of claim 11, wherein:
to estimate the first FOM, the processor is configured to calculate the first FOM based on a signal-to-noise ratio (SNR) of a signal reflected from the target object; and
to estimate the second FOM, the processor is configured to calculate the second FOM using an exponential decay function.

13. A non-transitory computer readable medium comprising program code that, when executed by a processor of a device, causes the device to:
obtain a channel impulse response (CIR) based on multiple ultrawide band (UWB) measurements between a mobile device and a target object;
calculate a range profile and frequency profile based on the CIR;
in response to determining that a dominant peak in the frequency profile is above a first predetermined threshold, estimate a first distance between the mobile device and the target object based on the range profile;
estimate a second distance between the mobile device and the target object based on a phase of the CIR; and
obtain an estimated distance between the mobile device and the target object based on at least one of the first distance and the second distance.

14. The non-transitory computer readable medium of claim 13, wherein the program code that causes the device to obtain the estimated distance between the mobile device and the target object comprises program code, that when executed by the processor, causes the device to:
calculate the estimated distance as an average of the first distance and the second distance.

15. The non-transitory computer readable medium of claim 13, wherein the program code that causes the device to obtain the estimated distance between the mobile device and the target object comprises program code, that when executed by the processor, causes the device to:
in response to determining that a velocity of the mobile device is greater than a second predetermined threshold, set the estimated distance to be equal to the first distance; and
in response to determining that the velocity of the mobile device is less than or equal to the second predetermined threshold, set the estimated distance to be equal to the second distance.

16. The non-transitory computer readable medium of claim 13, wherein the program code that causes the device to estimate the second distance comprises program code, that when executed by the processor, causes the device to:
obtain a clutter-removed CIR from the CIR using a high-pass filter;
obtain a phase difference using range bins in the clutter-removed CIR that are closest to a previously estimated distance value;
obtain a relative distance change based on the phase difference; and
estimate the second distance based on the relative distance change and the previously estimated distance value.

17. The non-transitory computer readable medium of claim 13, wherein the program code, when executed by the processor, further causes the device to:
estimate a first figure of merit (FOM) associated with the first distance, the first FOM indicating a reliability of the estimation of the first distance;
estimate a second FOM associated with the second distance, the second FOM indicating a reliability of the estimation of the second distance; and
obtain a reliability of the estimated distance between the mobile device and the target object based on at least one of the first FOM and the second FOM.

18. The method of claim 1, wherein the range profile is calculated by taking an average of energy of multiple frequency bins for each range bin of a range Doppler map.

19. The device of claim 7, wherein the processor is configured to calculate the range profile by taking an average of energy of multiple frequency bins for each range bin of a range Doppler map.

20. The non-transitory computer readable medium of claim 13, wherein the program code causes the device to calculate the range profile by taking an average of energy of multiple frequency bins for each range bin of a range Doppler map.

* * * * *